United States Patent [19]
Arm et al.

[11] Patent Number: 6,023,739
[45] Date of Patent: Feb. 8, 2000

[54] SYSTEM FOR INFORMATION PROCESSING COMPRISING PLURALITY OF PROCESSORS WHERE INTERCONNECTION NODES INSURE PRIORITY ACCESS TO CORRESPONDING ADDRESSABLE SPACES AND ESTABLISH HIERARCHY OF PROCESSOR PRIORITY ACCESS

[75] Inventors: Claude Arm, Cortaillod; Jean-Marc Masgonty, Corcelles; Christian Piguet, Neuchatel, all of Switzerland

[73] Assignee: CSEM - Centre Suisse D'Electronique et de Microtechnique SA, Neuchatel, Switzerland

[21] Appl. No.: 08/821,499

[22] Filed: Mar. 21, 1997

[30] Foreign Application Priority Data

Mar. 21, 1996 [FR] France ................... 96 03527

[51] Int. Cl.$^7$ ................................ G06F 13/374
[52] U.S. Cl. .................. 710/40; 710/3; 710/120; 711/148; 711/151; 364/230; 364/230.6
[58] Field of Search .................. 711/148, 151; 364/200, 230, 230.6, 228, 228.1, 229, 232.7, 238.3, 240, 243, 931.46, 964.6; 365/200; 340/172.5; 395/200.16, 325, 551, 183.19, 200.47; 710/3, 40, 120

[56] References Cited

U.S. PATENT DOCUMENTS 4,495,567  1/1985  Treen ........................... 364/200
4,928,234  5/1990  Kitamura et al. ............... 711/151

*Primary Examiner*—Meng-Ai T. An
*Assistant Examiner*—Chien Yuan

[57] ABSTRACT

In this device, each processor (P1 to P3) is associated with at least one addressable space (R1 to R3), whereas all the processors and all the addressable spaces are in communication by way of a common communication bus (BC).

Between all the processors and each addressable space is connected an intercommunicating connection node (N1 to N3), each connection node including control means (LC, D1, D2) for

- ensuring priority of access of any processor to its own addressable space; and
- ensuring a hierarchy of priority of access to the addressable spaces of the other processors among said plurality of processors.

7 Claims, 4 Drawing Sheets

SYSTEM FOR INFORMATION PROCESSING COMPRISING PLURALITY OF PROCESSORS WHERE INTERCONNECTION NODES INSURE PRIORITY ACCESS TO CORRESPONDING ADDRESSABLE SPACES AND ESTABLISH HIERARCHY OF PROCESSOR PRIORITY ACCESS

BACKGROUND OF THE INVENTION

1. Field of the Invention

The present invention relates to an information processing device comprising several processors in parallel.

An information processing device of this type is sometimes desired so as to increase the processing power, reduce the response time of the system to outside demands by executing several tasks in parallel, or else to simplify the programming of tasks which have intrinsically to be executed in parallel.

2. Description of the Prior Art

However, processing devices having several processors in parallel currently still have drawbacks which cause designers to hesitate to implement them systematically. Indeed, they require an inter-processor communication mechanism which is generally complicated and associated with complex software. If care is not taken, there is a risk that the processors will function rather slowly because of the time which must be devoted to inter-processor communication. Furthermore, it is virtually inevitable that special programming will have to be tailored to the processors and what is more, there is a risk that the consumption of energy will be relatively high owing to the need for the processors to intercommunicate.

SUMMARY OF INVENTION

The purpose of the invention is to provide an information processing device including several processors in parallel and which is devoid of the abovementioned drawbacks.

The subject of the invention is therefore an information processing device including a plurality of processors intended to operate in parallel, each processor being associated with at least one addressable space, wherein all the processors and all the addressable spaces are in communication by way of a common communication bus, wherein between all the processors and all the addressable spaces are respectively connected intercommunicating connection nodes embodied by a hardwired circuit, and wherein each connection node includes control means for ensuring priority of access of any processor to its own addressable space; and ensuring a hierarchy of priority of access to the addressable spaces of the other processors among said plurality of processors.

There is thus obtained a multi-processor information processing device, the construction of which is simple and which requires no specially designed program to operate the processors. The latter can belong to the categories of processors currently available on the market.

According to another characteristic of the invention, each of said processors is programmed by uniform instructions in each of which the address field includes an identification portion allocating this instruction, either to the addressable space of the relevant processor, or to the addressable space of another processor of the device.

By virtue of this characteristic, access to any addressable space of any processor of the device can be carried out with the aid of a single instruction and for the duration of the latter.

According to two distinct embodiments of the invention, the communication bus can be single or be multiple.

BRIEF DESCRIPTION OF THE DRAWINGS

Other characteristics and advantages of the invention will emerge in the course of the description which follows, given merely by way of example and made while referring to the appended drawings in which.

DESCRIPTION OF THE PREFERRED EMBODIMENTS

Figure 1:
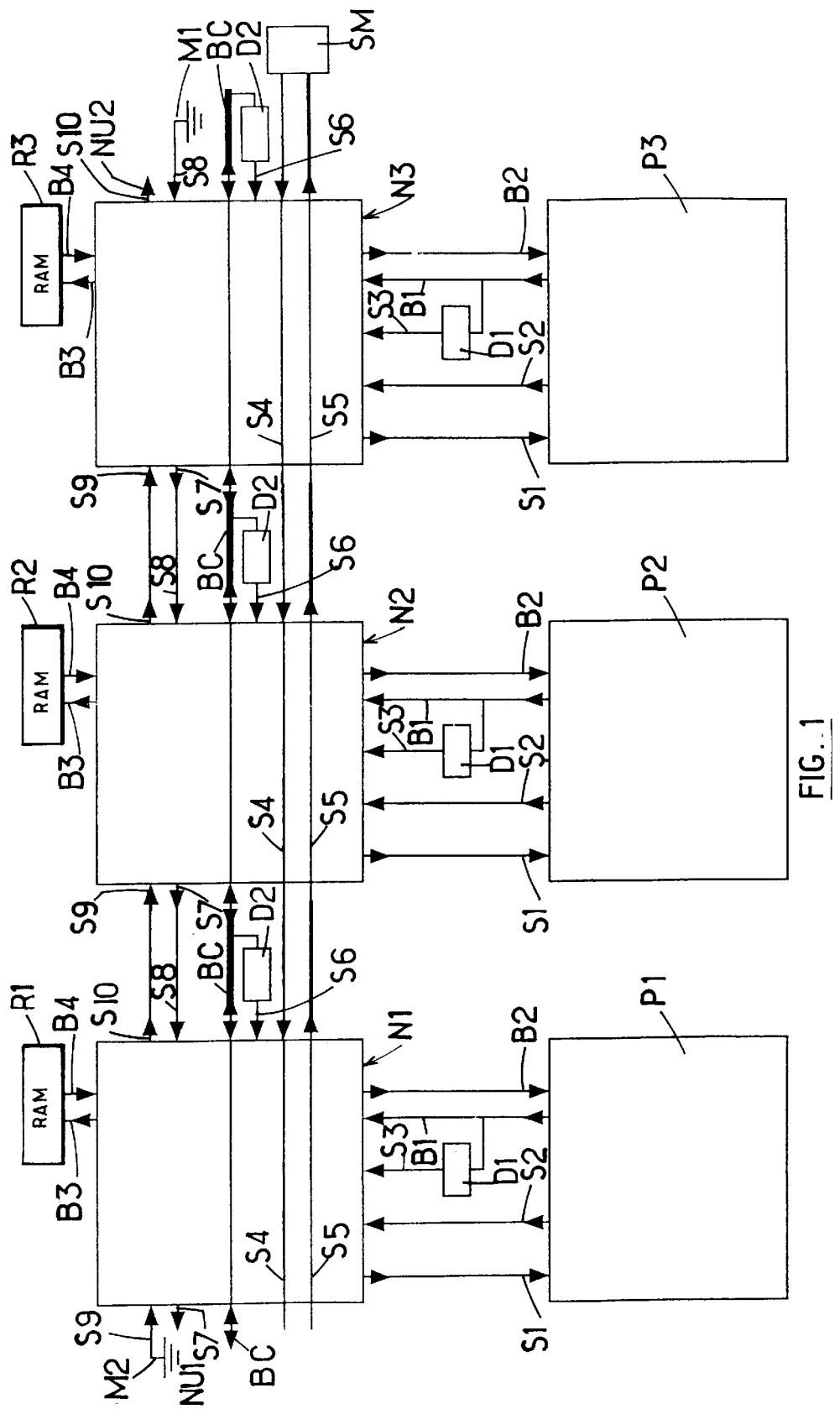
FIG. 1 is a diagram of an information processing device according to the invention including three processors in parallel.
Figure 2:
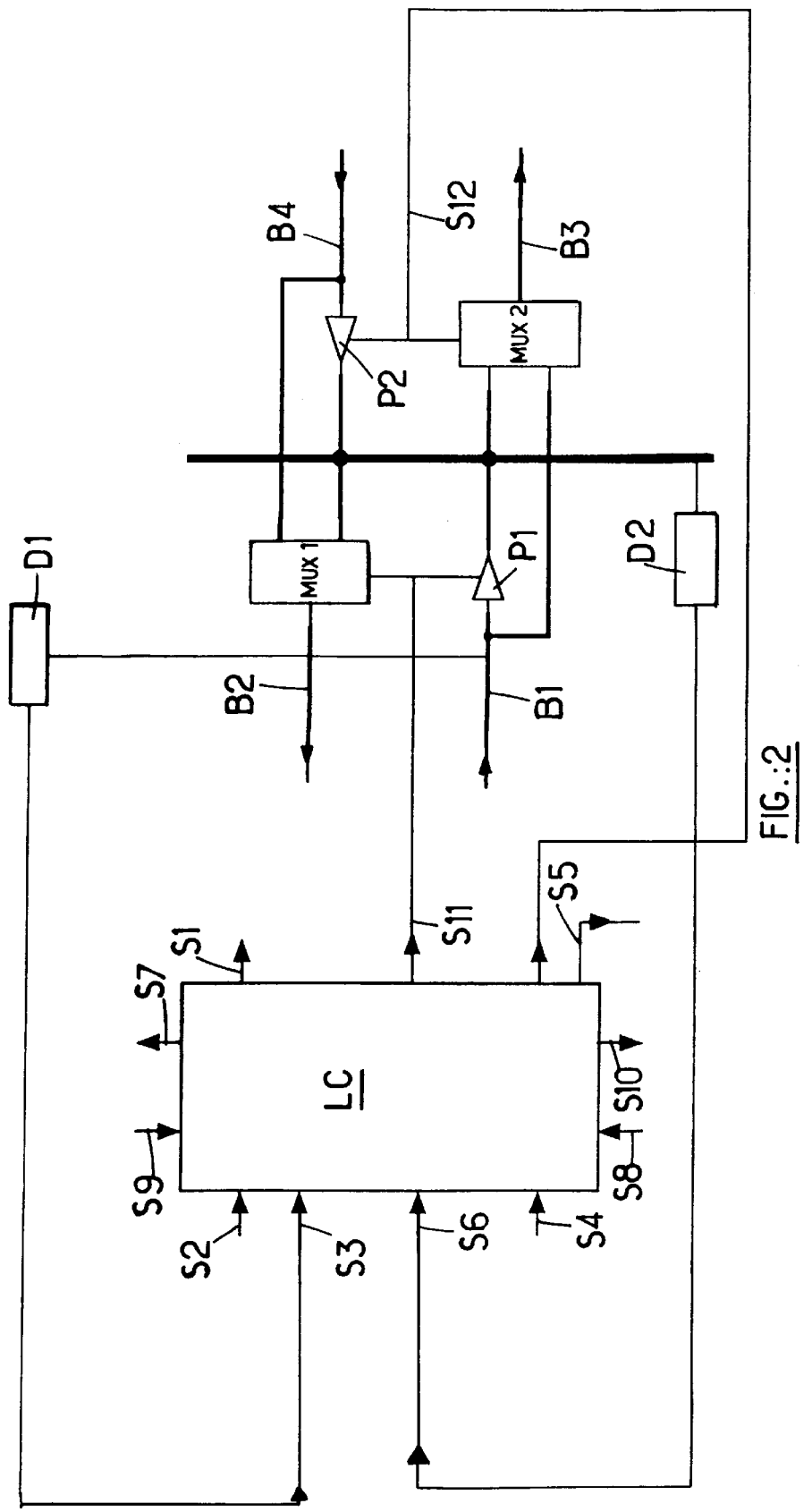
FIG. 2 is a diagram of a connection node used in the information processing device according to the invention.

The embodiment of the invention represented in FIGS. 1 and 2 will firstly be described. The processing device includes in this case, merely by way of example, three processors P1, P2 and P3 interconnected by way of a single communication bus BC in respect of addresses and data. However, it will be noted that the number of processors of the device according to the invention can be other than three. Moreover, the concept of the invention can be applied to processors of all common types available commercially or even specially designed ("custom designed"). Each processor is provided with its own ROM read only memory (not represented) in which are stored the program instructions which operate it.

According to an important aspect of the invention, the program instructions of all the processors are uniform in the sense that they all include an address field, one portion of which, three bits for example, is allocated to the identification of the access which will be performed by this instruction.

Each processor P1, P2 and P3 is connected to an addressable space which all the other processors can access according to a protocol which forms part of the concept of the invention. Here, "addressable space" is understood to mean any peripheral with which the processor or processors may be made to function. In the example of FIG. 1, just a single such peripheral has been represented, namely for each processor P1, P2 and P3, a random-access RAM memory R1, R2 and R3, respectively. Thus, each processor P1, P2 and P3 can read and write data from and to each of the RAM memories R1, R2 and R3, access being identified by the identification portion included in the address field of the relevant instruction.

A communication node, N1, N2 and N3 respectively, is associated with each processor. These communication nodes are linked not only to their own processor and to their own memory, but they are also interconnected. They are realized with the aid of hard-wired logic.

To ensure communication between the processors and the peripherals, each communication node can send or receive control signals and information elements (addresses and data). In the figures, these control signals have been designated by an alphanumeric reference close to the connection on which they are respectively transmitted.

Considering firstly the link between a node and a processor (the references S1, S2, S3 etc . . . designate both the signal and the corresponding connection in abbreviated form), we have:

the control signal S1 "PROCESSOR READ OK" (reading by processor validated) which is transmitted from the node to the processor;

the control signal S2 "REQUEST FROM PROCESSOR" (processor request for access to any addressing space) which is transmitted from the processor to its communication node; and the control signal S3 "PROCESSOR ACCESS OWN RAM" (the processor performs a write or read access to its own associated RAM memory) which is transmitted to the node of the processor from a decoder D1. This decoder extracts from an address travelling from the processor to the communication node over a bus B1, the identification portion representing a code on several bits indicating that this is a communication address at the level of the processor itself. As already indicated, the multi-bit code forms part of the addresses of the instructions contained in the programs of the processors. The decoder D1 sets the signal S3 to 1 if the processor sends an address belonging to its own addressable space. Otherwise, the signal S3 is at 0. The same bus B1 makes it possible to send data from the processor to the communication node.

Furthermore, a bus B2 links the processor to the communication node so as to convey data to this processor from, either its own memory or other peripherals, or memories and/or other peripherals of the other processors.

Before examining how the nodes N1, N2 and N3 are interconnected, it should be noted that the processors are assigned a priority of access one with respect to another. In the example represented, the processor P1 has priority over the processor P2 and the latter has priority over the processor P3.

As far as the links between the nodes N1, N2 and N3 are concerned, we have:

the control signal S4 "READ OTHER OK" (reading from the memory of a processor other than that of the relevant node is validated) which is transmitted over a line going from one node to another in the direction from the lowest priority to the highest priority of the processors;

the control signal S5 "OTHER READ OK" (reading by a processor from the memory of the processor of the relevant node is validated) which is transmitted from one node to another in the direction from the high-priority processor to the low-priority processor;

the control signal S6 "OTHERS ACCESS THIS RAM" (one of the other processors accesses the memory associated with the relevant node) which is transmitted to the node in question from the addresses conveyed on the main communication bus BC. The signal is decoded on a few bits of each address of the instructions by a decoder D2. The latter sets the signal S6 to 1 if the address belongs to an addressable space of a processor other than the relevant one. Otherwise, the control signal S6 is at 0;

the control signal S7 "REQUEST TO UPPER PRIORITY" (request for access to an upper priority) which is the corollary of the control signal S8 "REQUEST FROM LOWER PRIORITY" (request for access from a lower priority). In the case represented, these signals are transmitted from the lower priority to the upper priority, beginning with a ground connection M1 (value 0 in the case described) entering node N3 of lowest priority toward an unused connection NU1 leaving the node N1 of highest priority;

the control signal S9 "REQUEST FROM UPPER PRIORITY" (request for access from an upper priority) which is the corollary of the control signal S10 "REQUEST TO LOWER PRIORITY" (request for access to a lower priority). In the case represented, these signals are transmitted from the highest priority, beginning with a ground connection M2 (value 0) entering the node N1 of highest priority toward an unused connection NU2 leaving the node N3 of lowest priority.

Each node furthermore comprises a communication bus B3 sending addresses and data to the associated addressable space (or RAM memory) and a communication bus B4 conveying data originating from this addressable space.

The information processing device also includes a summator SM which is linked to the lines on which the signals S4 and S5 (READ OTHER OK and OTHER READ OK) are present. In this way, the signals S5 are combined and if at least one of the signals S5 is at 1, all the signals S4 are set to 1. Moreover, if all the signals S5 are at 0, the signals S4 are set to 0.

In FIG. 2 which represents a more detailed diagram of one of the communication nodes N1, N2 and N3, all identical, it may be seen that the control signals S1 to S10 are logically combined in hard-wired combinatorial logic LC so as to ensure the forwarding of addresses and data and compliance with priorities according to a process which will be described below. The construction of this combinatorial logic LC will be within the scope of specialists on reading the description of this manner of operation.

The combinatorial logic LC also generates an internal control signal S11 "PROCESSOR ACCESS OTHERS" (the processor of the relevant node accesses a memory of another processor), this signal controlling a multiplexer MUX1 as well as a gate P1. The combinatorial logic LC generates yet another control signal S12 "OTHERS ACCESS RAM" (one or more other processor or processors accesses or access a RAM memory). This signal controls another multiplexer MUX2 and another gate P2.

The communication bus BC conveys the following information elements:

the addresses in the addressable spaces which a processor wishes to read or write;

the data to be read or written; and the read and write control signals.

The buses B1 and B3 transport the following information elements:

the addresses in the addressable spaces which a given processor wishes to read or write;

the data to be written; and the read and write control signals.

The buses B2 and B4 convey the data read from the addressable spaces such as the RAM memories R1, R2 and R3.

Several operating configurations of the information processing device according to the invention will now be described in order to illustrate the operation thereof.

CONFIGURATION 1

When the signal S2 is 0 (that is to say inactive), the corresponding processor (which can be one of the three processors P1, P2 or P3), undertakes no access to an addressable space including to its own addressable space. The latter is therefore available for access by one of the other processors. The combinatorial logic LC then assigns the following values to the control signals S1 and S11: S1=1, S11=0. The signals S9 and S10 are transmitted in the upper priority to lower priority direction and the signals S7 and S8 are transmitted in the opposite direction. If then the signal S9 or S10 is at 1 and if the signal S6 is at 1, then the signals S5 and S12 are at 1, otherwise these signals are at 0.

CONFIGURATION 2

When the signal S2 is at 1 (the signal is active), the processor in question wishes to undertake an access to an addressable space. If the signal S3 is at 1, this addressable space is the RAM memory of the relevant processor. This access always has priority. Under these conditions, S1=1, S11=0, S5=0 and S12=0, the signals S9 and S10 switch in the upper priority to lower priority direction and the signals S8 and S7 switch in the reverse direction.

CONFIGURATION 3

When the signal S2=1, the relevant processor wishes to undertake an access to an addressable space. If the signal S3 is at 0, this is an addressable space other than its own. If then S9=0, the processor in question gains access to the communication bus BC. The signals S7, S10 and S11 are at 1 and the signals S5 and S12 are at 0. Under these conditions, if the signal S4 is at 1, the signal S1 is at 1.

CONFIGURATION 4

When the signal S2 is at 1, the relevant processor wishes to undertake an access to an addressable space. If the signal S3 is at 0, the processor wishes to access an addressable space other than its own. If the signal S9 is at 1, a processor other than the relevant one seizes the communication bus BC. The control signals are then in the following state: S10=1, S1=0 and S11=0. Under these conditions, if S6=1, then the signals S5 and S12 are at 1, otherwise they are at 0.

CONFIGURATION 5

When the signals S11 and S12 are at 0, the relevant processor accesses its own addressable space (or no access is undertaken to this space). Under these conditions, the bus BC receives no signal from this processor or from this addressable space (the gates P1 and P2 are disabled), so that this bus may be tied up by another processor and another addressable space. Moreover, the multiplexers MUX1 and MUX2 (FIG. 2) are controlled so as to establish communication between the buses B1 and B3 and the buses B2 and B4 respectively.

CONFIGURATION 6

When the signal S11 is at 1 and the signal S12 is at 0, the relevant processor accesses an addressable space belonging to another processor. Under these conditions, the buses B1 and B2 are connected to the communication bus BC respectively by the gate B1 and the multiplexer MUX1. The buses B3 and B4 are not used in this case.

CONFIGURATION 7

When the signal S11 is at 0 and the signal S12 at 1, a processor other than the relevant one accesses the addressable space of the latter. The buses B3 and B4 are then connected to the communication bus BC respectively by the multiplexer MUX2 and the gate P2, whereas the buses B1 and B2 are not used.

Figure 3:
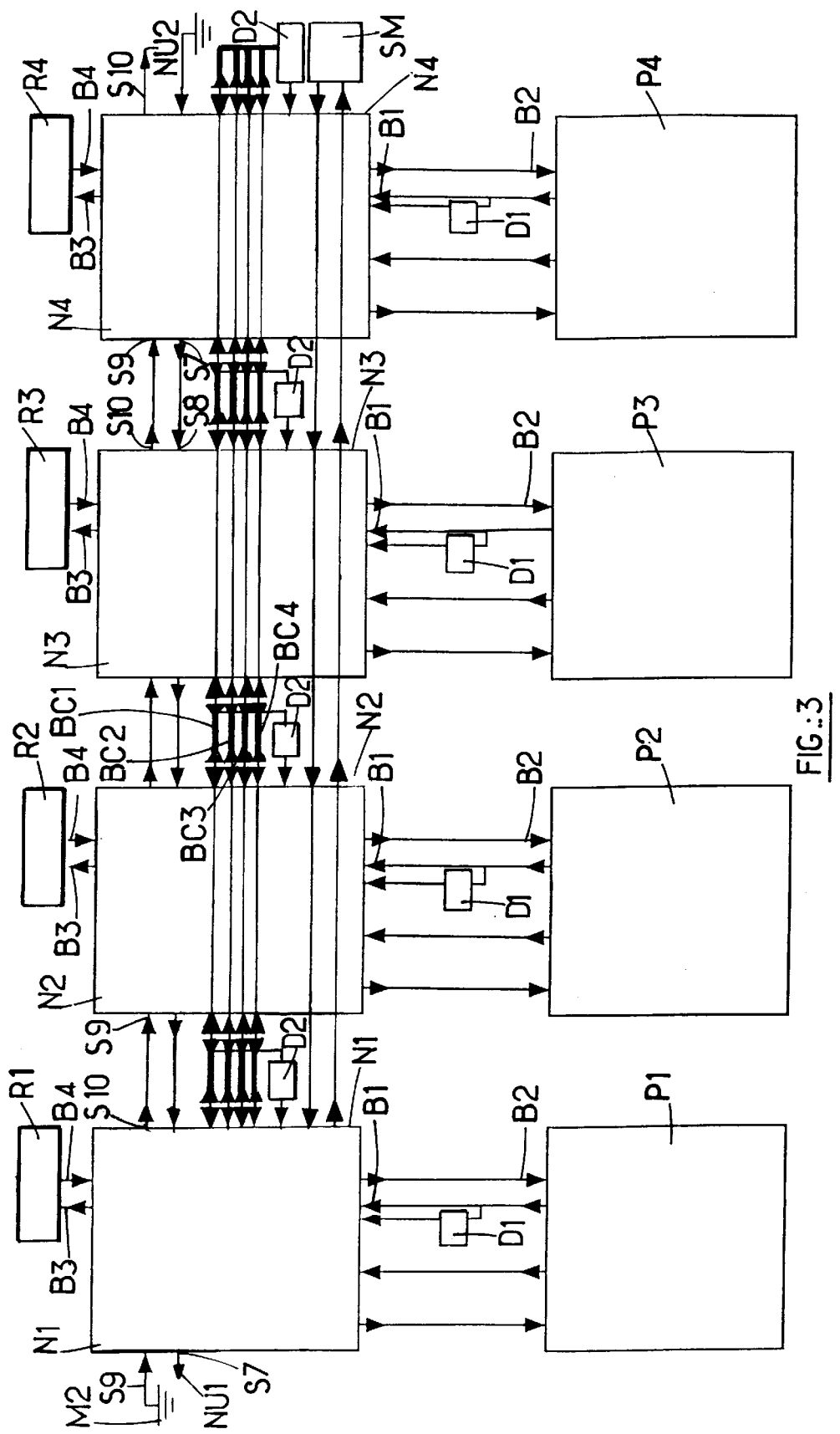
FIG. 3 is a diagram of another embodiment of the information processing device according to the invention.
Figure 4:
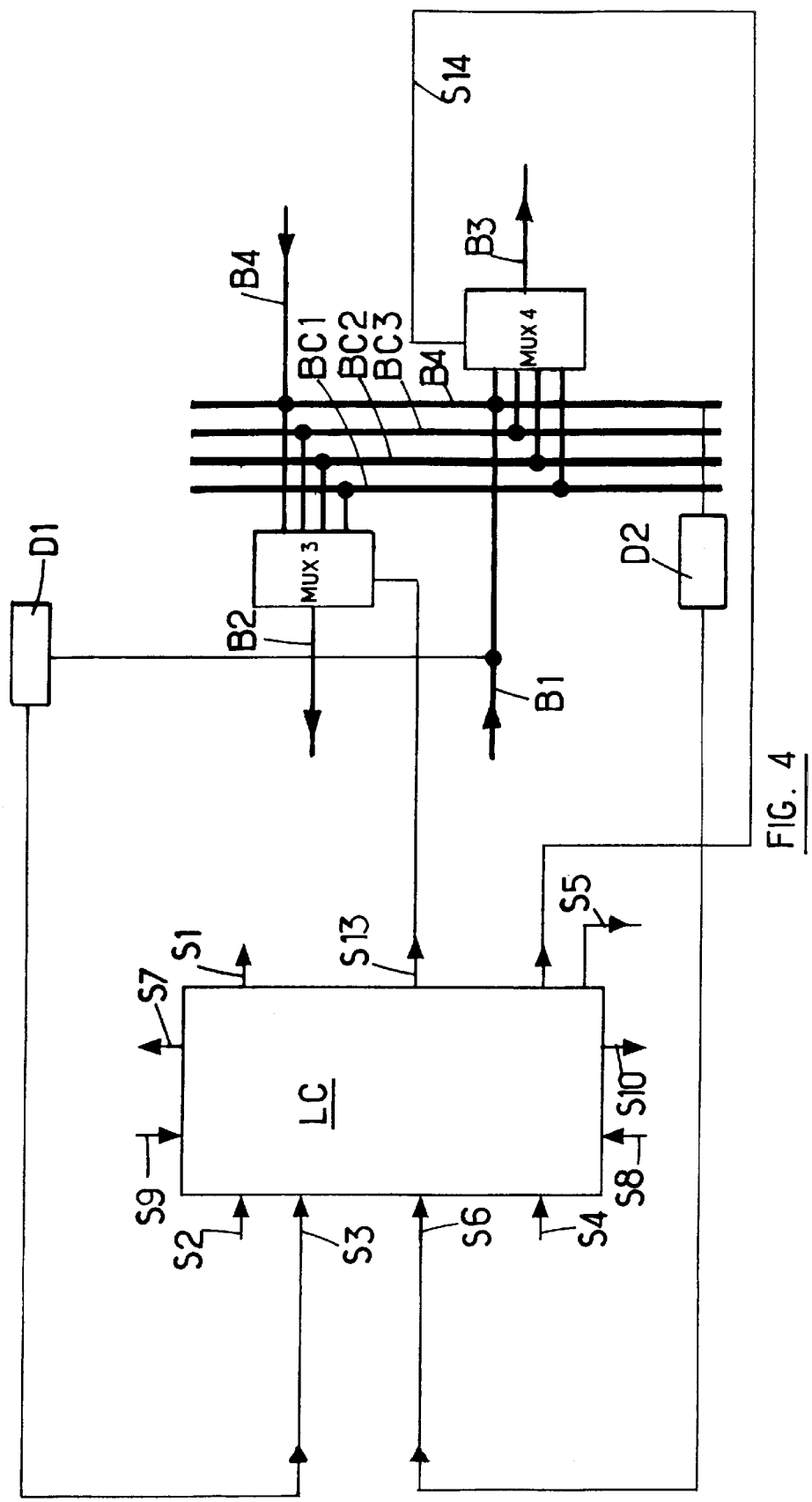
FIG. 4 is a diagram of a connection node used in the information processing device of FIG. 3.

FIGS. 3 and 4 represent another embodiment of the information processing device according to the invention aimed at increasing the processing speed as compared with what may be obtained with the setup represented in FIGS. 1 and 2.

The example represented includes four processors P1 to P4, four addressable spaces R1 to R4 and four connection nodes N1 to N4. The processors P1 to P4 are here connected directly one to another by a multiple communication bus comprising four buses BC1 to BC4 capable of simultaneously conveying different information. The communication nodes N1 to N4 are similar to those already described with regard to FIGS. 1 and 2, except for their part intended to manage the buses BC1 to BC4. Thus, the signals S11 and S12 generated inside each node are replaced by a control signal S13 "SELECT PROC BUS" (select processor bus) and a control signal S14 "SELECT RAM BUS" (select RAM memory bus). The first S13 of these signals controls a multiplexer MUX3 making it possible to connect the bus B2 to one or other of the buses BC1 to BC4. The second signal S14 controls a multiplexer MUX4 making it possible to connect the bus B3 to one of these communication buses BC1 to BC4.

The data conveyed by the buses B1 and B4 is placed continually on one of the buses BC1 to BC4.

Below will be examined the configurations of the processing device, which differ from those already discussed above in relation to FIGS. 1 and 2, on account of the modifications which have just been presented.

CONFIGURATION 8

When the signal S2 is at 0, the relevant processor undertakes no access to an addressable space, its own addressable space is therefore available for access by one of the other processors. Under these conditions, S1=1, the signal S9 switches to S10 and the signal S8 switches to S7. If one of the signals S8 or S9 is at 1 and if the signal S6 is at 1, the signal S5 is set to 1 and the signal S14 shunts the corresponding communication bus BC1 to BC4 onto the processor which is requesting access, otherwise S5=0 and the signal S14 is arbitrary. The signal S13 is also arbitrary.

CONFIGURATION 9

When the signal S2 is at 1, the relevant processor wishes to undertake an access to an addressable space. If the signal S3 is at 1, the processor accesses its own addressable space, in priority fashion. Then S1=1 and the signal S13 shunts the bus B4 to the bus B2. The signal B14 shunts the bus B1 to the bus B3. The signal S9 switches to S10 and the signal S8 switches to S7. S5=0.

CONFIGURATION 10

When the signal S2 is at 1, the relevant processor wishes to undertake an access to an addressable space. If the signal S3 is at 0, the processor wishes to access an addressable space other than its own. If the signal S9 is at 0, this processor seizes the bus. Then S7=1 and S10=1. The signals S5 are at 0. If S4 is at 1, then S1=1. The signal S13 shunts the bus BC1 to BC4 corresponding to the addressable space which the processor wishes to access, to the bus B2. The signal S14 is arbitrary.

CONFIGURATION 11

When the signal S2 is at 1, the relevant processor wishes to undertake an access to an addressable space. If the signal S3 is at 0, the processor wishes to access an addressable space other than its own. If the signal S9 is at 1, another processor seizes the bus. Then S7=1 and S10=1. The signal S13 is arbitrary and S5=0. If the signal S6=1, then the signal S5 is set to 1 and the signal S14 shunts the bus BC1 to BC4 corresponding to the processor which wishes to access the addressable space. Otherwise, S5=0 and the signal S14 is arbitrary.

We claim:

1. An information processing system comprising:
   a plurality of processors;
   a plurality of bi-directional buses;
   a plurality of interconnection nodes, each connection to a different corresponding one of said processors through a corresponding one of said bi-directional buses;

a plurality of addressable spaces, each connected, to a different corresponding one of said interconnection nodes through a corresponding one of said bi-directional buses;

a common communication bus connected to all of said interconnection nodes for establishing communication paths between all of said processors and all of said addressable spaces through said common bus and said bi-directional buses; each of said interconnection nodes including:

a control logic circuit for ensuring priority access by the processor corresponding to said interconnection node to the addressable space corresponding to said interconnection node and for establishing, together with the interconnection nodes corresponding to the other processors through said common communication bus, a hierarchy of priority of access to each of said addressable spaces by processors other than the processor connected to the interconnection node corresponding to the addressable space in question; each said control logic circuit including:

a decoder responsive to the content of an address field in instructions programming the corresponding processor for establishing direct access by said corresponding processor to the addressable space corresponding to said interconnection node if the content of said address field designates a location in said addressable space.

2. The device as claimed in claim 1, wherein each of said processors is programmed by uniform instructions in each of which the address field includes an identification portion allocating this instruction, either to the addressable space of the relevant processor, or to the addressable space of another processor of the device.

3. The information processing system as claimed in claim 1 wherein said control logic circuit includes a second decoder connected to said common communication bus for decoding said address field output by the relevant one of said processors and in order to generate a control signal which reserves an addressable space corresponding to another processor for said relevant processor.

4. The device as claimed in of claim 1 wherein said connection nodes are interlinked by priority connections intended to transfer priority signals from one node to another in a predetermined order of priority according to which the processors are ranked.

5. The device as claimed in claim 1 wherein said communication bus is a single bus.

6. The device as claimed in claim 1 wherein said communication bus is a multiple bus.

7. The information processing system of claim 1 wherein said interconnection nodes are connected in series by said common communication bus, the control logic circuit of each of said interconnection nodes being responsive to the position of said interconnection node in said series for determining the position in said hierarchy of the processing element corresponding to said interconnection node.

* * * * *